United States Patent [19]
Yueh

[11] 3,863,017
[45] Jan. 28, 1975

[54] SEA FOOD PRODUCTS
[75] Inventor: Mao H. Yueh, Minneapolis, Minn.
[73] Assignee: General Mills, Inc., Minneapolis, Minn.
[22] Filed: Jan. 15, 1973
[21] Appl. No.: 323,573

[52] U.S. Cl............ 426/376, 426/149, 426/212, 426/388, 426/513, 426/516
[51] Int. Cl............................................ A23l 1/325
[58] Field of Search ......... 99/18, 111, 14, 158, 160; 426/149, 224, 212, 274, 364, 376, 506, 513, 520

[56] References Cited
UNITED STATES PATENTS
3,301,686  1/1967  Bacon .................................. 99/18
3,620,767  11/1971  Swartz ................................ 426/376
3,712,821  1/1973  Ronsivalli et al. ..................... 99/111
3,730,728  5/1973  Patashnik et al. ..................... 99/111

Primary Examiner—Raymond N. Jones
Assistant Examiner—R. A. Yoncoskie
Attorney, Agent, or Firm—Anthony A. Juettner; Gene O. Enockson; Norman P. Friederichs

[57] ABSTRACT

A fabricated sea food product is prepared by at least partially cooking fish up to form loose fibers. Fresh fish may be finely comminuted to form a heat-coagulable paste. The loose fibers and the paste are mixed and formed in the desired shape. The shaped product is then heat coagulated.

10 Claims, No Drawings

SEA FOOD PRODUCTS

BACKGROUND OF THE INVENTION

The present invention relates to food products and more particularly to sea food products fabricated from natural sea food materials.

Meat analogs have been prepared in the past using a variety of methods. A meat analog is a food product made to resemble a meat flesh material such as chicken, beef, fish or pork. Such food products typically have been prepared from the vegetable protein materials such as soybean and the like. One method for preparing such food products includes solubilizing the vegetable protein with a strong alkaline material such as sodium hydroxide and then extruding the solubilized protein through spinnerets into a coagulating acid bath. The resulting fibers are then held together in bundles with a binder such as egg albumen.

Certain problems are inherent in preparation of meat analogs from vegetable protein materials. For example, it may be necessary to prepare a protein concentrate from the vegetable protein source materials prior to texturization of the vegetable protein. Also the vegetable protein material may not have the desired amino acid balance or other nutritionally desirable qualities. In this case it may be necessary to add other protein materials or amino acids in order to provide the desired amino acid balance. Flavor in vegetable protein materials has also created problems at times. For example, a soybean flavor may remain in the product. The present invention avoids such problems by preparing the analog from the natural fish materials.

One preferred embodiment of the present invention includes preparing a mass of loose, at least partially cooked, and heat set fish flesh fibers and a fish paste binder. The fish paste binder is prepared by finely comminuting uncooked fish flesh. The loose fibers and paste are mixed and then formed in any desired shape, such as in the shape of a shrimp or lobster tail. The molded product is then heat set.

The fish used in the present invention may be either fresh water fish or salt water fish. Typical fish that may be used include cod, perch, herring, mackerel, salmon, eilchard, pollock, carp, walleye pike and the like. The fish should be fresh; that is, not stale or degraded in any way. The fish may be frozen prior to use in the present invention.

The mass of loose, heat set fish flesh fibers may be prepared by heating the fish flesh sufficiently to maintain the integrity of the individual fibers and working the fish thereby breaking the fish up into individual fibers or small clumps of fibers. The fish preferably is exposed to a heated surface or a heated chamber during the heating process so that the fibers are partially dehydrated typically reducing the moisture content 10 to 75 percent by weight. (The terms "percent," "parts" and the like as used herein will mean percent or parts by weight unless otherwise stated.) The loose fibers, therefore, have a moisture content of about 50 to 80 percent, by weight, preferably about 65 to 75 percent. Sufficient water may be added to the fibers, paste or mixtures thereof to return the moisture content of the sea food analog to such desired level.

The heating may be carried out on a hot surface, for example, a hot grill or alternatively a conventional drum drier. The temperature of the surface typically may be in the range of 212° to 320°F. and the duration of the cooking may be about 5 seconds to 3 minutes. During the cooking process the temperature of the fish is desirably raised to between 160 and 210°F. The temperature of the fish should be rapidly raised in order to obtain the desired or preferred texture of the present invention. The heating may be carried out in an autoclave at temperatures of 215° to 260°F. and pressures of 1 p.s.i.g. to 20 p.s.i.g. for 3 to 30 minutes.

The fish paste binder may be prepared by finely comminuting uncooked fish flesh in any type of apparatus that will form a fine mince such as by reducing the fish particles to macrofilament size and smaller. The fish paste, for example, may be macrofilaments, myofibrils, fragmented myofibrils and aggregates of myofibrils or mixtures thereof. One type of apparatus that has been found to work satisfactorily is a cutter-mixer, typically a Hobart VCM Model No. 15-3 or Model No. 40. Another type of suitable apparatus would be a Griffith's Mince Master. During the comminution step the fish material preferably is maintained at a reduced temperature such as 28° to 52°F., preferably 30° to 40°F. This may be accomplished by the addition of ice to the fish or by carrying out the operation in a cold room. Ice and/or water in an amount of about 2 to 25 percent, by weight of the paste, may be added also for purposes of improving texture and moistness of the finished product.

The mass of loose fibers may be mixed with the paste by hand or by a vacuum mixer such as the vacuum mixer produced by Keebler Engineering Co. The ratio of fibers to paste may be about 0.2 to 5.0 parts fibers to one part paste by weight. Other desired ingredients may be added such as flavoring (i.e. artificial shrimp flavor, salt and the like), coloring, starch, flour, egg white, etc. Such ingredients may be added to the fibers, to the paste and/or to the mixture of fibers and paste. It is preferred to add sodium tripolyphosphate to the paste in an amount of from 0.1 to 2.5 percent, typically, 0.5 to 1.5 percent, by weight of the product. Sodium chloride may be added to the paste. The mixture of fibers and paste may be formed into any desired shape. This may be done by placing the mixture in a suitable mold or by extruding the mixture. The shaped mixture may be heat set in an oven or steam chamber typically at a temperature of 212° to 350°F. for 2 to 10 minutes. The product may be breaded if desired.

The product may be packaged and frozen until the ultimate consumer is ready to use the product. At the time of use, the product may be thawed and cooked such as by deep fat frying or baking.

The product of the present invention has a substantially increased bite closely simulating that of shrimp and lobster. Fish, conventionally baked, on the other hand has significantly less bite.

The following examples are for purposes of illustration and are not intended to be limiting. For example, various modifications may be made such as the use of other types of fish material, other types of comminuting equipment and other types of cooking or heat setting equipment.

EXAMPLE I

A product resembling lobster tail was prepared according to the present invention. One hundred parts of cod fish were placed in a frying pan together with 1 part salt, 1 part sugar, 5 parts butter and a small amount of monosodium glutamate. The mixture was partially cooked over an electrical hot plate while constantly stirring to break up the fish pieces into fibers. The cooking was discontinued while the fibers still appeared moist but had become separated. The fibers were found to be elastic. The yield at this point was approximately 70 percent based on the original weight of the mixture. Thus the fish apparently lost 30 percent in weight principally because of dehydration. A fish paste was prepared by placing the following in a vertical cutter-mixer (Hobart VCM Model 15-3) operated at 3500 rpm for 2 minutes to yield a homogeneous and smooth mixture: 100 parts coarsely ground partially thawed cod fish, 5 parts wheat flour, 3 parts tapioca starch, 10 parts ice, 2 parts sugar, 5 parts dry egg white powder, 1 part salt, 1 part sodium tripolyphosphate and 0.01 part ribonucleotides. A 50:50 mixture of the fibers and paste was prepared. One hundred grams were placed in a metal lobster-shaped mold and then heated in an oven for 10 minutes at 350°F. The resulting coagulated lobster analog was removed from the mold, wrapped in aluminum foil and frozen. The lobster analog was later heated in an oven for 30 minutes at 350°F. and then eaten with drawn butter. The product was found to be highly satisfactory and had the eating qualities of lobster.

EXAMPLE II

A product resembling shrimp was prepared according to the present invention. A fish fiber and paste mixture was prepared as described in Example I, except that an artificial shrimp flavoring also was added and the mixing of the fibers and paste was carried out under vacuum thereby preventing voids or bubbles in the mixture. The mixture was then extruded in the shape of shrimp. The shrimp-like pieces were heat set in an oven for 3 minutes at 350°F. Some pieces of the product were breaded and fried in a conventional manner. The fried product was frozen and later heated in an oven for 30 minutes at 300°F. Other breaded pieces were first frozen and then later fried in a conventional manner. In both instances the products closely resembled shrimp and had the eating characteristics of shrimp.

EXAMPLE III

A product resembling lobster was prepared according to the present invention by heating 1,400 grams of cod fish flesh in an autoclave at 21 p.s.i.g. and 250°F. for 10 minutes. The cod was cooled to room temperature and broken up into loose fibers and small fibrous lumps. The loose fibers were moist, elastic and had a good biting quality. The yield was about 1,050 grams or 70 percent by weight. To the fibers was added about 1 percent salt, 1 percent sugar and 0.02 percent monosodium glutamate. Paste was prepared as described in Example I. One part fibers and 1.5 parts paste were mixed. The mixture was molded in the shape of a lobster tail and heat set in an oven.

EXAMPLE IV

One hundred parts of fresh cod fish flesh was cut into chunks and fed to a conventional drum drier which included a pair of heated rotating drums. The drums were spaced about 1/16 to ⅛ inch apart. The temperature of the drums was between 220° and 260°F. The fish were heated for about 5 to 30 seconds and then scraped off the drums. The fibers were then loosened by stirring. The fish lost about 35 percent in weight during the heating. One hundred parts of fresh cod fish flesh was mixed with 1 part sodium chloride, 1 part sodium tripolyphosphate, 10 parts ice, 0.01 part ribonucleotides and 2 parts sugar. The mixture was treated in a Hobart VCM Model 15-3 for 2 minutes at 3,500 rpm to prepare a paste. The paste was mixed with the heat set fibers in a 1:1 ratio. The fiberpaste mixture was molded and heat set. The product closely approximated lobster.

EXAMPLE V

Three samples V-A through V-C were prepared in order to compare the so-called "bite" or strength of texture. Sample V-A was a sea food analog prepared according to the present invention. The three pieces comprising Sample V-A were prepared substantially as described in Example IV. The temperature of the drum drier was 240°F. and the fish material was heated on the drum drier for 10 seconds. The fish material lost about 35 percent in weight during heating in the drum drier. The fibers were loosened and mixed with fish paste in a ratio of one part fiber to 1.5 parts cod fish paste. The mixture was coagulated in an oven at 350°F. for 5 minutes and then turned over and heated for 3 minutes on the other side. Sample V-B was prepared in a similar manner except the product was composed solely of coagulated fish paste and did not contain heat set fibers. Sample V-C was baked cod. The samples V-A through V-C were each tested by eating. Sample V-A was found to have substantially greater bite and chewiness than either Sample V-B or V-C.

The embodiments of the invention in which an exclusive property or privilege is claimed are defined as follows:

1. A method for preparing a fabricated sea food product comprising: heating fish flesh to a temperature of from 160° to 210° F. for a time sufficient to maintain the integrity of the individual fibers and working said fish to break said fish up into individual fibers to produce heat set fibers; finely comminuting uncooked fish flesh to form a heat coagulable paste; mixing said heat set fibers and said paste in a ratio of about 0.2 to 5.0 parts fibers per part paste; and heat setting the mixture.

2. The method of claim 1 wherein said fish flesh is heated at a temperature of from 212° to 320°F. for from 5 seconds to 30 minutes to heat set the fibers, the fiber-paste mixture is shaped prior to heat setting and the mixture is heat set at a temperature of 212° to 350°F. for 2 to 10 minutes.

3. The method of claim 2 wherein said shaping is by molding.

4. The method of claim 2 wherein said shaping is by extrusion.

5. The method of claim 1 wherein loose fibers are partially dehydrated during heating of said fibers by removing 10 to 75 percent of the moisture of the fibers.

6. The method of claim 5 wherein moisture is added to the loose fibers to raise the moisture content to at least about 65 percent by weight.

7. The method of claim 1 wherein moisture is added in an amount sufficient to provide a total moisture content of from 65 to 75 percent by weight of the product.

8. The method of claim 1 wherein from 0.1 to 2.5 percent sodium tripolyphosphate by weight of the sea food analog is added to the paste.

9. The method of claim 8 wherein from 0.5 to 1.5 percent sodium tripolyphosphate is added and wherein sodium chloride is added to the paste.

10. The method of claim 1 wherein the step of comminuting the fish flesh reduces the fish flesh to particles comprising separate macrofilaments, myofibrils, fragmented myofibrils and aggregates of myofibrils.

* * * * *